United States Patent [19]

Bourgeois

[11] 4,273,234
[45] Jun. 16, 1981

[54] CONVEYOR STORAGE SYSTEM

[76] Inventor: Ronald D. Bourgeois, 38 Ellison Park, Waltham, Mass. 02154

[21] Appl. No.: 8,881

[22] Filed: Feb. 2, 1979

[51] Int. Cl.³ .............................................. B65G 37/00
[52] U.S. Cl. .................................. 198/347; 198/482; 198/796; 198/809
[58] Field of Search ............... 198/347, 367, 369, 370, 198/372, 482, 796, 801, 809, 457, 371, 436, 437, 440, 611, 597, 425–427, 429, 430, 492

[56] References Cited

U.S. PATENT DOCUMENTS

| 2,771,177 | 11/1956 | Cutter et al. | 198/425 |
|---|---|---|---|
| 3,101,143 | 8/1963 | Valentyne et al. | 198/796 |
| 3,104,004 | 9/1963 | Poel et al. | 198/457 |
| 3,164,239 | 1/1965 | Reed | 198/611 |
| 3,470,996 | 10/1969 | Lee et al. | 198/347 |
| 3,499,555 | 3/1970 | Wahle | 198/347 |
| 3,592,325 | 7/1971 | Sullivan et al. | 198/371 |
| 3,822,777 | 7/1974 | Jepsen | 198/372 |

Primary Examiner—Joseph E. Valenza
Attorney, Agent, or Firm—Joseph S. Iandiorio

[57] ABSTRACT

A conveyor storage system comprising an elevator conveyor system including an elevator conveyor; first drive means for driving the elevator conveyor; and first control means for selectively energizing the drive means in the load and unload direction; the elevator conveyor having a plurality of carrier members fixed to and spaced longitudinally along it and extending outwardly therefrom; each of the carrier members including a plurality of elements extending outwardly from the conveyor and spaced from each other; and a transfer conveyor system including a delivery conveyor system having a plurality of individual modular conveyor units for engaging with the carriers; the conveyor units being spaced apart to accommodate the carrier elements and extending into the spaces between the elements to load and unload the elevator conveyor system; second drive means for driving the conveyor unit; and second control means for selectively energizing the second drive means in the load and unload direction, for receiving and replacing product with its orientation unchanged.

2 Claims, 16 Drawing Figures

CONVEYOR STORAGE SYSTEM

FIELD OF INVENTION

This invention relates to a conveyor storage system and more particularly to a system which uses an elevator conveyor that maintains original orientation of stored product.

BACKGROUND OF INVENTION

Mismatches between the rate of product input to and output from a conveyor are typically taken care of with some sort of diverting, delay, or storing action. For example, a temporary oversupply of product is often accommodated by simply loading excess product on trays manually and manually reintroducing them later when the situation is corrected. Aside from being a rather haphazard, unorganized approach, this also requires careful replacing of items which require a particular orientation for processing. Another approach uses spiral or other sorts of delaying conveyors which are permanently a part of the system for use, for example, in increasing transit time of product in a freezing or heating compartment.

SUMMARY OF INVENTION

It is therefore an object of this invention to provide an improved conveyor storage system.

It is a further object of this invention to provide such an improved conveyor storage system which may be actuated as needed to automatically store and replace excess products.

It is a further object of this invention to provide such a system which removes and replaces the product in the same orientation.

The invention features a conveyor storage system which includes an elevator conveyor system and a transfer conveyor system. The elevator conveyor system includes an elevator conveyor and first drive means for driving the elevator conveyor. There are first control means for selectively energizing the drive means in the load and the unload direction. The elevator conveyor has a plurality of carrier members fixed to and spaced longitudinally along it and extending outwardly from it. Each of the carrier members includes a plurality of elements extending outwardly from the conveyor and spaced from each other. The transfer conveyor system includes a delivery conveyor system with a plurality of individual modular conveyor units for engaging with the carriers. The conveyor units are spaced apart to accommodate the carrier elements and extend into the spaces between the elements to load and unload the elevator conveyor system. There are second drive means for driving the conveyor units, and second control means for selectively energizing the second drive means in the load and unload directions, for receiving and replacing product with its orientation unchanged.

In preferred embodiments, the conveyor storage system includes means for synchronizing operation of the first and second drive means. A transfer conveyor is provided for feeding to and from the delivery conveyor system. The carrier member may include hinge means for pivotally fixing it to the elevator conveyor, and the carrier member may include a lower platform and an upper platform, each of which includes the spaced elements.

The individual modular conveyor unit includes a support section, a plurality of support rollers rotatably mounted on the section, and a conveyor belt extending about the support rollers and adapted for driving engagement with the second drive means. The support section may be tapered from a larger dimension to a smaller dimension at the end extending between the carrier elements. The elevator conveyor system may include a conventional conveyor system or a rack and pinion construction.

DISCLOSURE OF PREFERRED EMBODIMENT

Other objects, features and advantages will occur from the following description of a preferred embodiment and the accompanying drawings, in which.

The invention may be accomplished with a conveyor storage system which has an elevator conveyor system driven by a first motor and a transfer conveyor system including a delivery conveyor system driven by a second motor. The elevator conveyor system may be a conventional chain-drive conveyor belt which has a number of carrier members mounted on it, either hingedly or fixedly. The carrier elements typically have a lower platform formed of a number of figures spaced from each other. The carrier members may also include an upper platform constructed in the same way for use in conveyors which drive the carrier members over the top of the conveyor and down the back side of the conveyor. The elevator conveyor system may also be made with a rack and pinion structure.

The delivery conveyor system in the transfer conveyor system includes a plurality of individual modular conveyor units which engage with the carriers. Each of these conveyor units has separate mounting means so that they may be mounted to the transfer conveyor body in spaced relation to each other so that they accommodate the elements of the carrier members, which are raised and lowered through them. There are drive means associated with the delivery conveyor system and the elevator conveyor system, and control means operate them in the load and unload directions. These control means form a part of a supervisory circuit which also includes means for synchronizing the operation of the drive means for those two conveyors to ensure that the transfer between them goes smoothly during automatic operations.

Each individual modular conveyor unit typically includes a support section and a plurality of rollers which carry a conveyor belt that extends around all the rollers and is adapted for driving engagement with the second drive means when the unit is installed. The support may be tapered from a larger dimension to a smaller dimension at the end extending between the carrier elements. These modular conveyor units may be added and removed as necessary to feed whatever extent of elevator conveyors is required to provide the proper storage capacity, and they may be spaced in accordance with the size of the product being conveyed.

Figure 1:
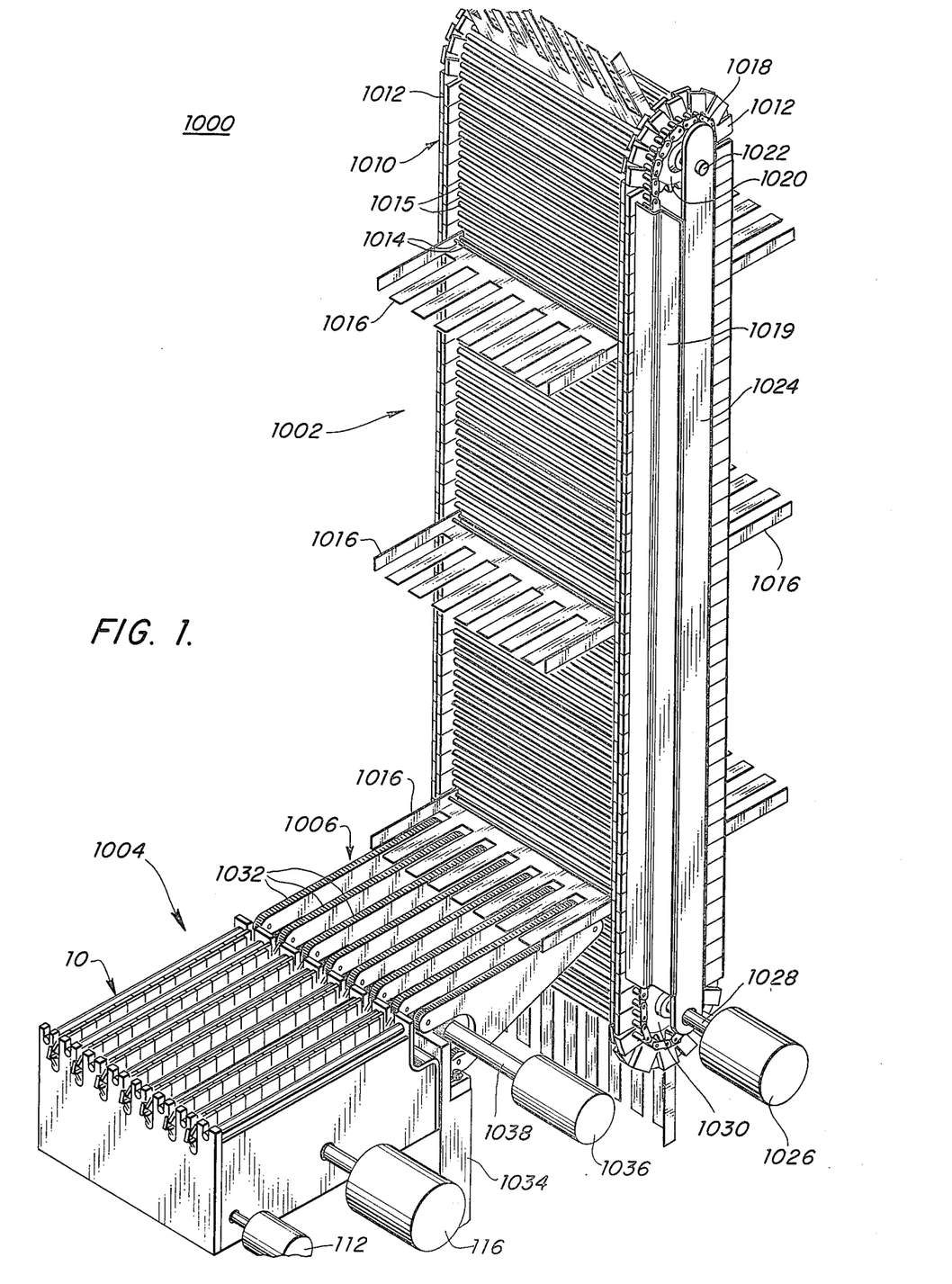
FIG. 1 is an axonometric view of a conveyor storage system according to this invention.
Figure 4:
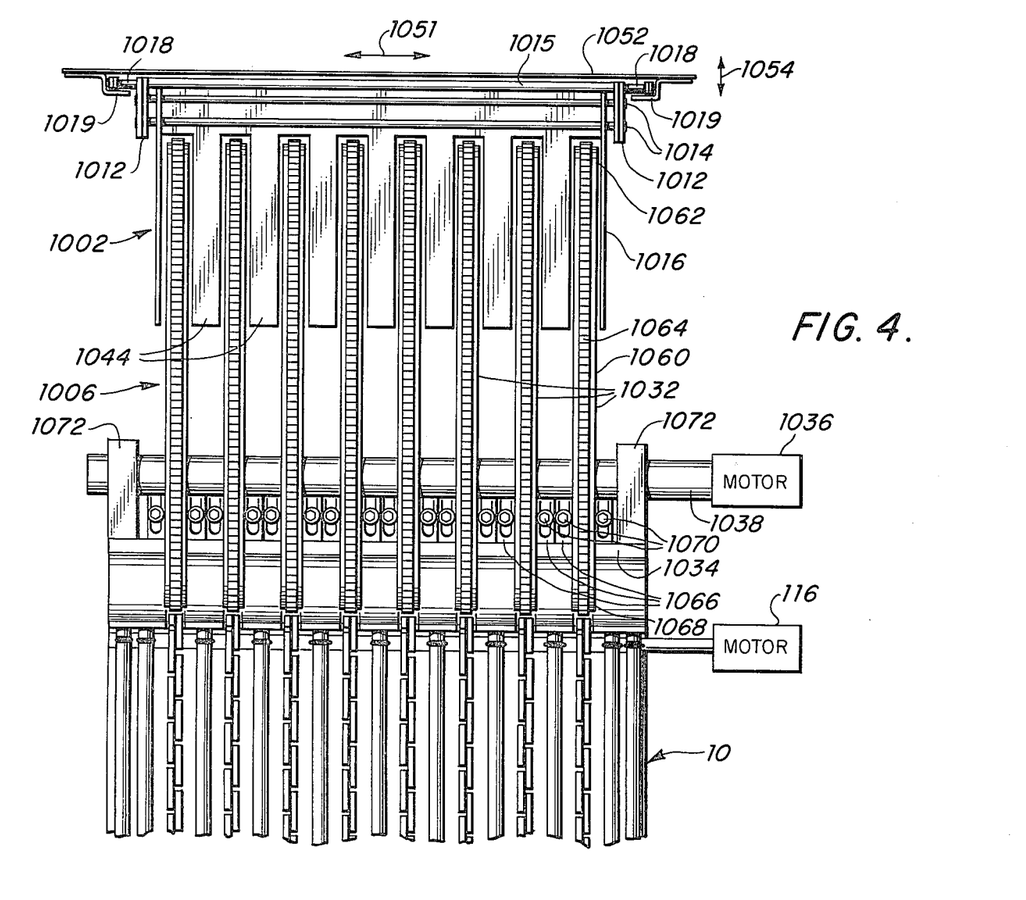
FIG. 4 is a plan view of the conveyor storage system of FIG. 1 showing portions of the diverting conveyor system and elevator conveyor system.

There is shown in FIG. 1 a conveyor storage system 1000 according to this invention which includes elevator conveyor system 1002 and transfer conveyor system 1004, which includes a delivery conveyor system 1006 and diverting conveyor system 10. Elevator conveyor system 1002 includes a roller conveyor belt 1010 including raised pieces 1012 at either side which receive rods 1014 that mount carrier 1016. Conveyor 1010 is formed of a plurality of rollers 1015 with a chain drive 1018 in guides 1019 on either end, FIG. 4, that engages with sprockets 1020, only one of which is visible, mounted on shaft 1022 in frame 1024. Conveyor belt 1010 is powered by motor 1026, which drives shaft 1028 on which are mounted sprockets 1030, only one of which is visible, FIG. 1, that drive chain 1018.

Delivery conveyor system 1006 includes a plurality of modular conveyor units 1032 which are mounted on frame 1034 for engagement with carrier members 1016. Modular units 1032 are driven by motor 1036 through shaft 1038.

Figures 2, 3:
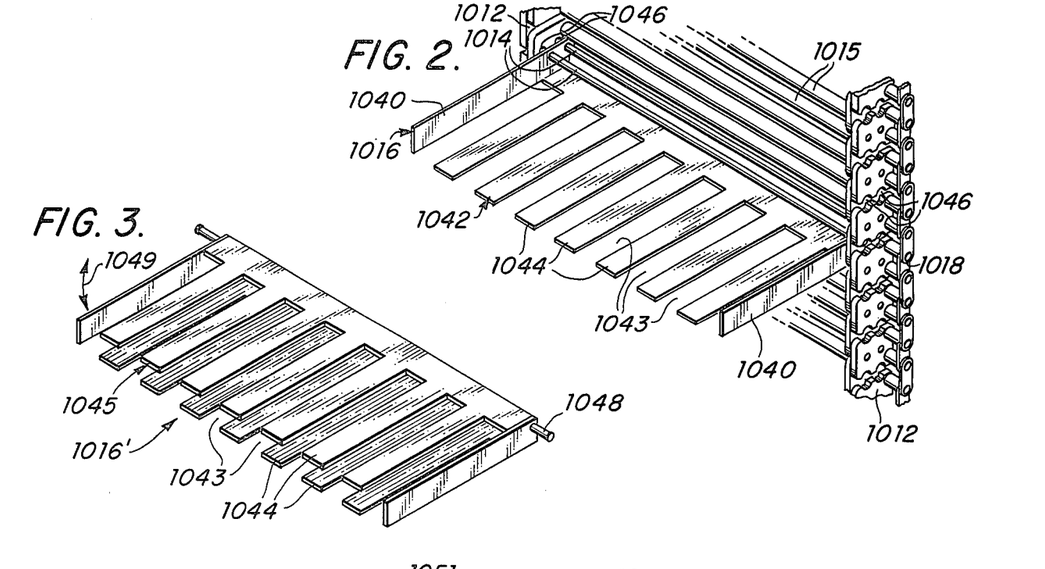
FIG. 2 is an enlarged axonometric view of a portion of the elevator conveyor system of FIG. 1 showing the carrier member in greater detail.
FIG. 3 is an axonometric view of a carrier member with an upper platform and adapted for hinged interconnection with the elevator conveyor system of FIG. 2.

Carrier member 1016, FIG. 2, includes side members 1040 and a lower platform 1042 formed of a plurality of elongate fingers 1044 with spaces 1043 therebetween. Rods 1014 are fastened in holes 1046 of raised pieces 1012. Alternatively, FIG. 3, carrier member 1016' may be mounted using a single rod 1048 which functions as a hinge and allows carrier member 1016' to swing as indicated by arrow 1049. Carrier member 1016' may include an upper platform 1045 with elements 1044 and spaces 1043 aligned with those of lower platform 1042.

Chain guides 1019 serve to limit the movement of chains 1018 and belt 1015 to the left and right as indicated by arrows 1051. Chain guides 1019 together with backing plate 1052 also serve to limit movement of belt 1015 and chains 1018 in the direction shown by arrows 1054.

Figure 5:
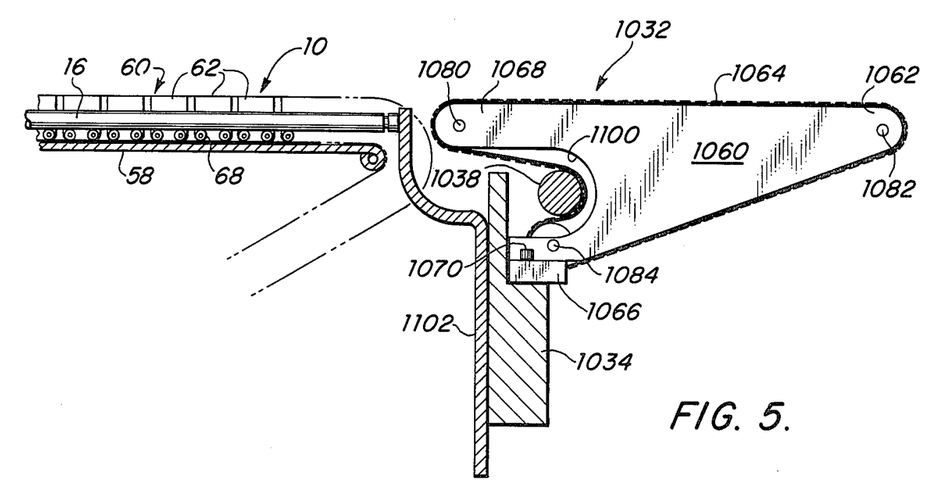
FIG. 5 is an enlarged detailed elevational view of an individual modular conveyor unit of the delivery conveyor system and a portion of the diverting conveyor system with which it cooperates.

Each of modular conveyor units 1032 of delivery conveyor 1006 includes a long, narrow section 1060 whose outer end 1062 extends deep into spaces 1043 between elements 1044 of carrier member 1016. Section 1060 carries a conveyor belt 1064 and has a pair of feet 1066 near its inner end 1068 proximate diverting conveyor 10, which facilitates mounting with screws 1070 to frame 1034. Shaft 1038 engages and drives belts 1064 and is journaled in bearing members 1072, which are omitted from FIG. 1 for clarity of illustration.

Figure 6:
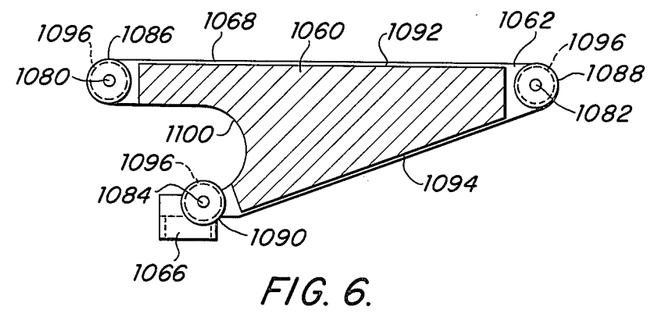
FIG. 6 is a cross-sectional view through the modular conveyor unit of FIG. 5.
Figure 11:
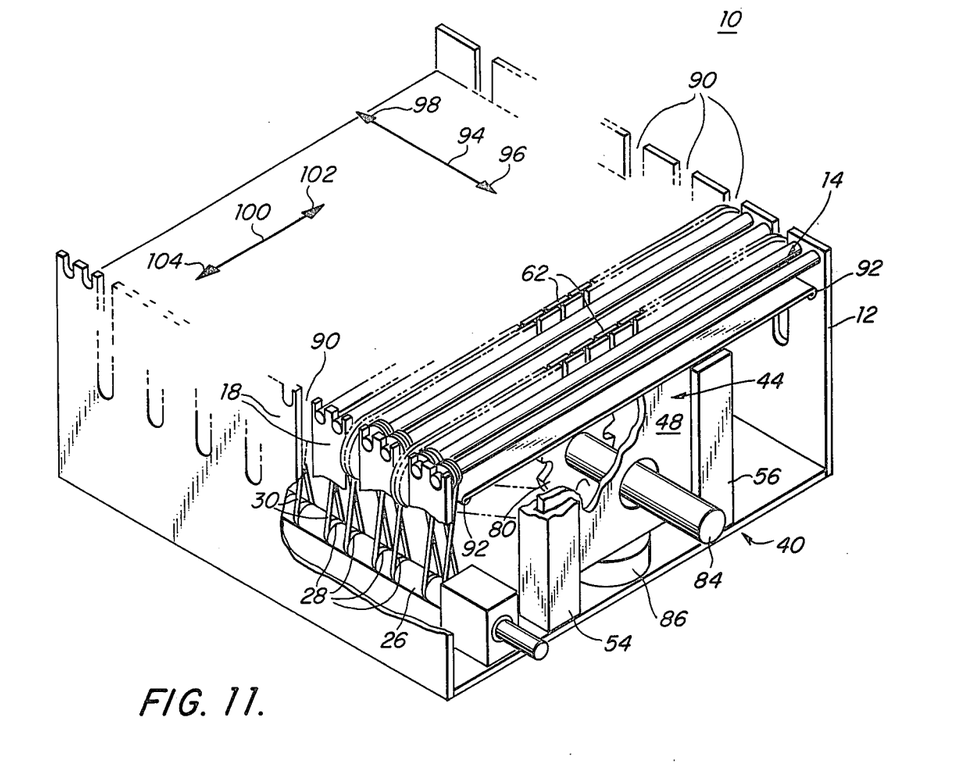
FIG. 11 is an axonometric view with portions broken away of a diverting conveyor according to this invention.

Modular conveyor unit 1032 may include three shafts 1080, 1082, 1084, FIG. 5, which mount three rollers 1086, 1088, 1090, FIG. 6, which position belt 1064 in upper and lower grooves 1092, 1094 and dispose belt 1064 for gripping shaft 1038, FIG. 5, when section 1060 is installed on frame 1064. Each of rollers 1086, 1088, 1090 contains grooves 1096 for receiving belt 1064. Section 1060 is tapered so that its leading end 1062 is narrower than its inner end 1068. Inner end 1068 contains a recess 1100 which accommodates shaft 1038. The end wall 1102 of diverting conveyor 10 may be curved as shown in FIG. 5 to facilitate receiving belt 1064 in close proximity to the cooperating belt of diverting conveyor 10. Alternatively, wall portion 1102 may be generally totally planar as indicated in FIG. 11 et seq., in which case mounting member 1034 can be enlarged to provide the proper positioning.

Figure 7:
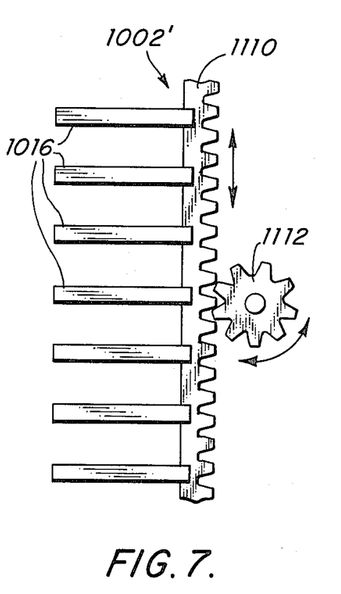
FIG. 7 is a diagrammatic illustration of an alternative construction for the elevator conveyor system according to this invention.

Although elevator conveyor 1002 has been shown as a generally conventional conveyor, this is not a necessary limitation of the invention. For example, elevator conveyor 1002', FIG. 7, uses a rack 1110 and pinion 1112 construction in which the carrier members 1016 are carried on rack 1110.

Figure 8:
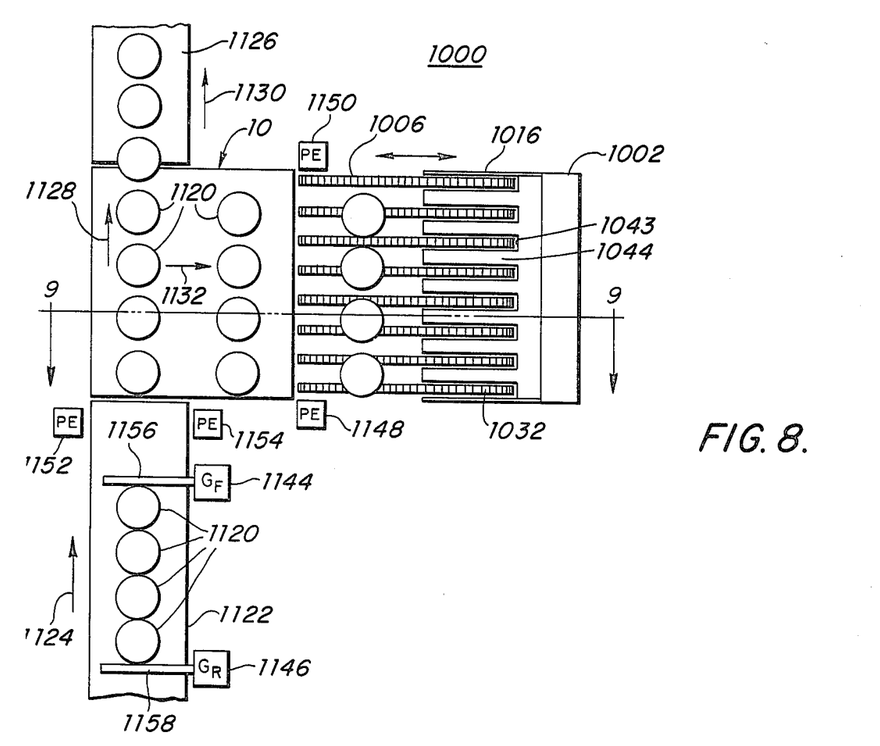
FIG. 8 is a diagrammatic plan view of the conveyor storage system according to this invention and an associated primary conveyor showing the flow path of conveyed product.
Figure 9:
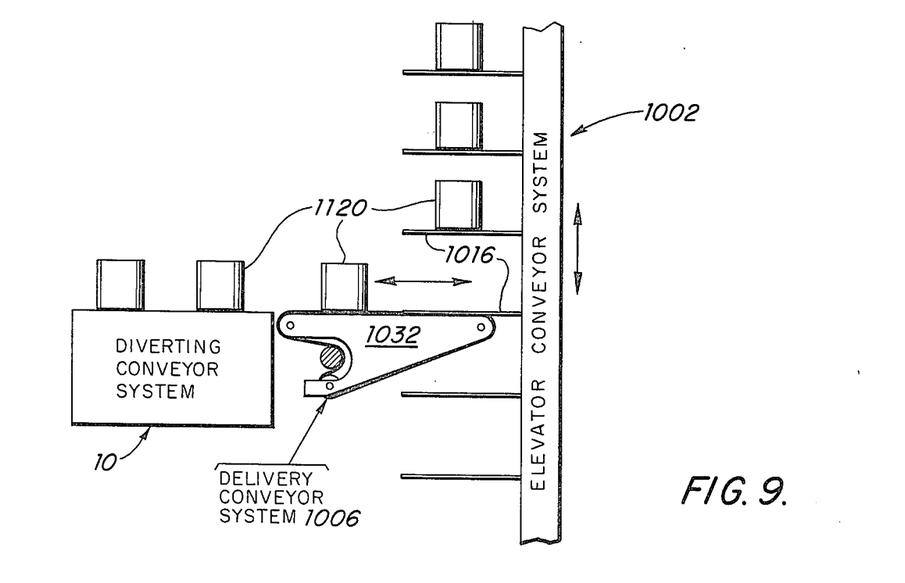
FIG. 9 is a view taken along lines 9—9 of FIG. 8.

In operation, product 1120, FIGS. 8 and 9, moves along primary conveyor 1122 in the direction shown by arrows 1124. Normally they continue right on with rollers 16 of diverting conveyor 10 delivering the product straight through to the rest of primary conveyor 1126 in the direction as indicated by arrows 1128 and 1130.

Periodically, or when a storage mode of action is required, a predetermined number of product 1120, such as four for example, is selectively deposited on diverting conveyor 10. When this occurs, conveyor 60, which is moving in the direction of arrow 1132, is raised and drives a line of four product 1120 onto delivery conveyor 1006, which moves them onto a carrier member 1016 of elevator conveyor 1002. Conveyor 1002 is then indexed to lift that loaded member out of the way and bring in the next empty carrier member 1016 to engage with delivery conveyor system 1006.

In the unloading mode, elevator conveyor 1002 is indexed down to place product 1120 on delivery conveyor system 1006, which is now operating in the opposite direction, to deliver the returning product to diverting conveyor system 10, which is also operating in the opposite direction to bring the product into line with primary conveyor 1126, whereupon the raised flights are dropped and conveyor 16 of diverting conveyor system 10 returns product 1120 into the main stream of conveyor 1126.

Figure 10:
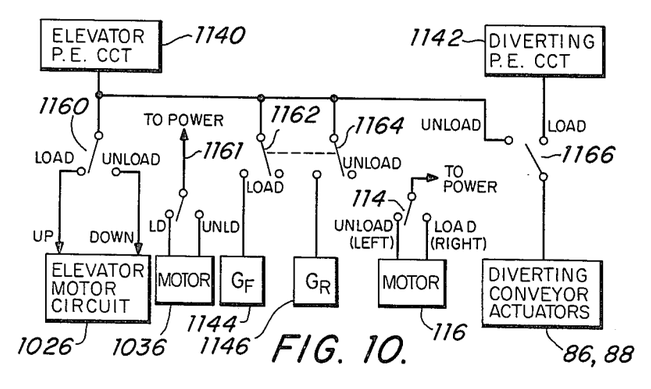
FIG. 10 is a schematic diagram of a supervisory circuit of the conveyor storage system of FIG. 1.

The synchronized operation of the various conveyors is accomplished by means of elevator photoelectric circuit 1140 and diverting photoelectric circuit 1142, FIG. 10, forward gate 1144, and rear gate 1146. Elevator photoelectric circuit 1140 includes photoelectric detector units 1148 and 1150, FIG. 8, and diverting photoelectric circuit 1142 includes photoelectric units 1152 and 1154. Forward gate 1144 and rearward gate 1146 each includes a blocking arm 1156, 1158, respectively, which traps and holds a predetermined number, in this example four, pieces of product 1120. A control means for operating the system in the load and unload modes may include switches 1160, 1161, 1162, 1164, 114, and 1166, FIG. 10.

In operation, in the loading mode all the switches 1160, 1161, 1162, 1164, 114, and 1166, are set to the load position. Thus in diverting conveyor system 10, conveyor 16 is conveyed in the forward direction 1128; conveyor 60 is conveying to the right in FIG. 8 as indicated by arrow 1132, and it is down so that its flights 62 are below rolls 16. Delivery unit conveyor system 1006 is being driven to the right in FIG. 8, also as indicated by arrow 1132. Initially, diverting conveyor actuators 86, 88, FIG. 10, are operated to raise flights 62 of conveyor 60 above rows 16 so that four products 1120 are conveyed to the right, FIG. 8, onto delivery conveyor system 1006. As they pass detector units 1148, 1150, they block them, which causes forward gate 1144 to open and rear gate 1146 to close. When the product 1120 clears the detector units 1148 and 1150, the elevator motor circuit 1026 is driven to index the elevator conveyor up one position to replace the now loaded carrier member 1016 with an empty carrier member 1016 positioned in engagement with delivery conveyor system 1006. When the detector units 1148 and 1150 are clear they also operate to close forward gate 1144 and open rear gate 1146 to load four more product 1120 between them.

Each time forward gate 1144 is opened by the initial blocking of detector units 1148 and 1150, photodetector units 1152, 1154 become blocked by the group of four products 1120 which pass between them. This causes diverting conveyor actuators 86, 88 to drop conveyor 60 and retract flights 62 below rollers 16. This enables the product to load fully onto diverting conveyor system 10. After detector units 1152 and 1154 are clear, diverting conveyor actuators 86 and 88 once again raise conveyor 60 so that flights 62 take the four product 1120 to the right and load them onto delivery conveyor system 1006 for loading onto elevator 1002 for storage.

In the unloading mode, switches 1160, 1161, 1162, 1164, 114, and 1166 are thrown to the unload position. Each time detector units 1148 and 1150 are cleared, flights 62 are raised and elevator conveyor 1002 is indexed down one position by a motor 1036. During this time, gates 1144, 1146, and detector units 1152 and 1154 are not used except to the extent that forward gate 1144 is left in the blocking position.

Thus the loading and unloading of this storage system is done completely automatically, synchronously, and with the product always in the same orientation. Although as shown in FIG. 8 for example, carrier member 1016 has but seven elements 1044 and eight spaces 1043 cooperating with eight delivery units 1032, this is not a necessary limitation of the invention; for the carrier members 1016 and the entire elevator conveyor 1032 may be extended as needed to meet the particular storage requirements. The modular construction and driving mechanism of delivery units 1032 are particularly advantageous in this connection. Of course the storage capacity could also be increased by increasing the vertical dimension of the elevator conveyor system and by using carrier members which have upper as well as lower platforms so that the back side of the elevator conveyor system can as well be used for storage.

Figure 12:
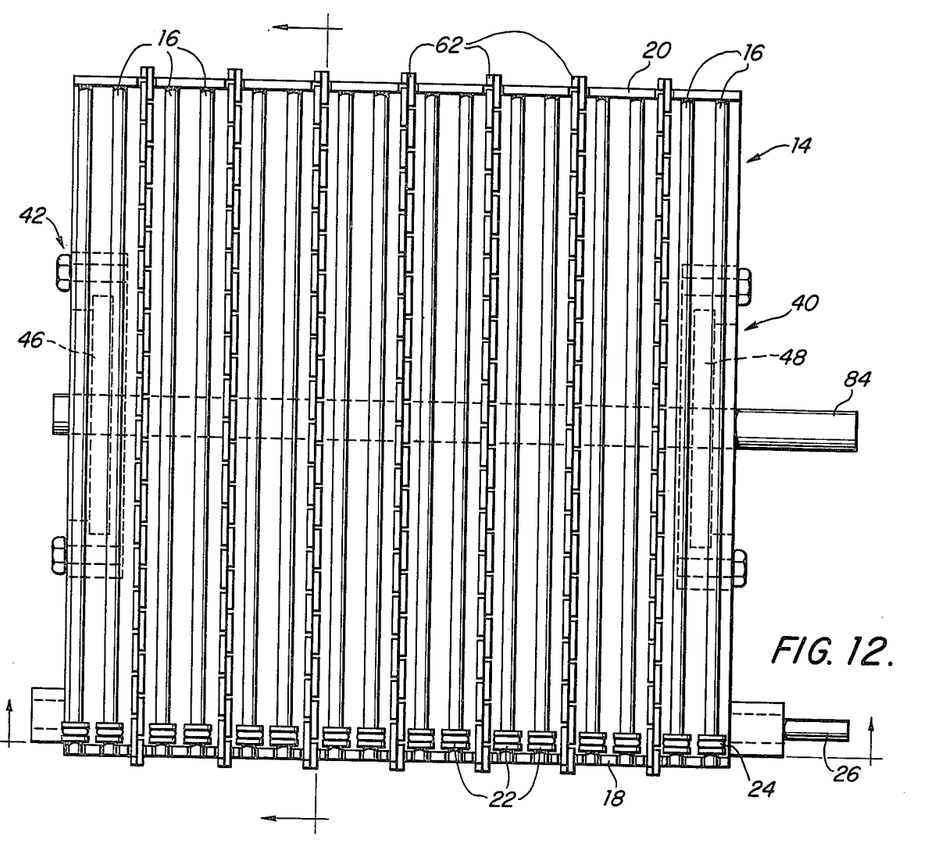
FIG. 12 is a top plan view of the conveyor unit of FIG. 11.
Figure 13:
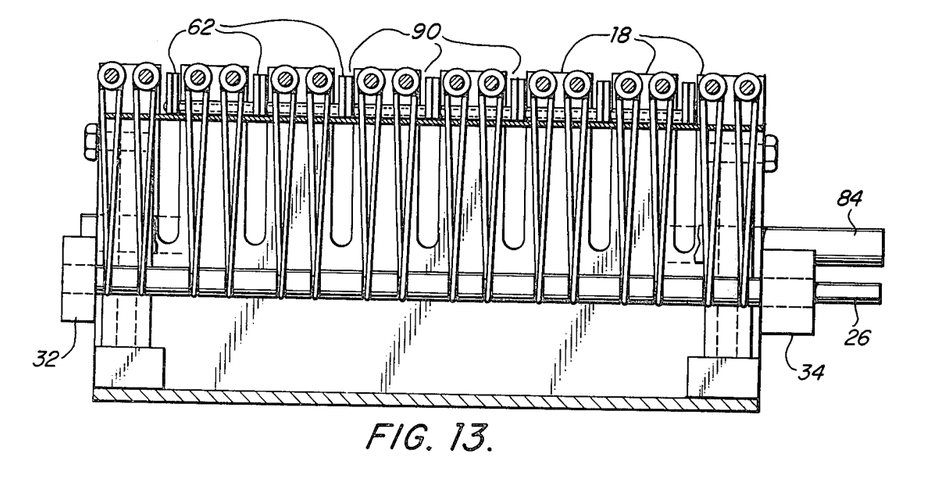
FIG. 13 is a view taken along lines 3—3 of FIG. 12 with the diverting conveyor lowered.

Diverting conveyor unit 10, FIG. 11, including a support structure 12 and a static main conveyor 14, FIG. 12, is comprised of a plurality of rollers 16 rotatably mounted on upstanding members 18 and 20 of support structure 12. Pulleys 22 are mounted between members 18 and the ends of rollers 16, and constitute a portion of drive apparatus 24 which also includes drive shaft 26, FIGS. 11 and 13, which has a number of pulleys or grooves in it for engaging belts 30, which also engage pulleys 22 to drive rollers 16. Shaft 26 is rotatably mounted in bearings 32, 34, FIG. 13.

Figure 14:
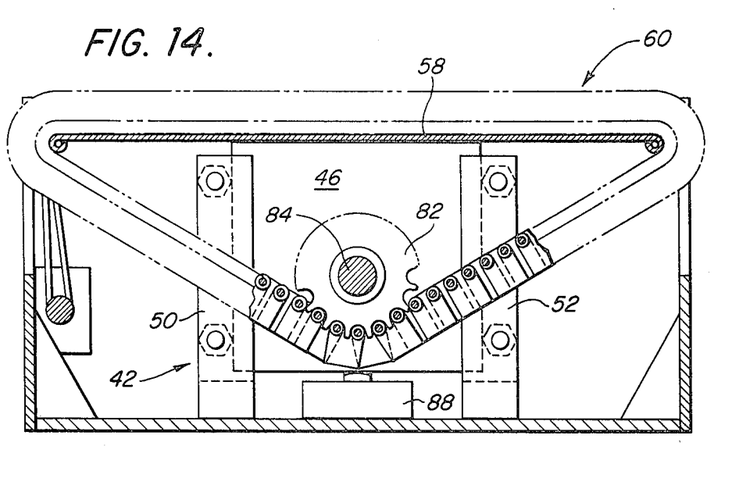
FIG. 14 is a view taken along lines 4—4 of FIG. 12 with the diverting conveyor raised.
Figure 14A:
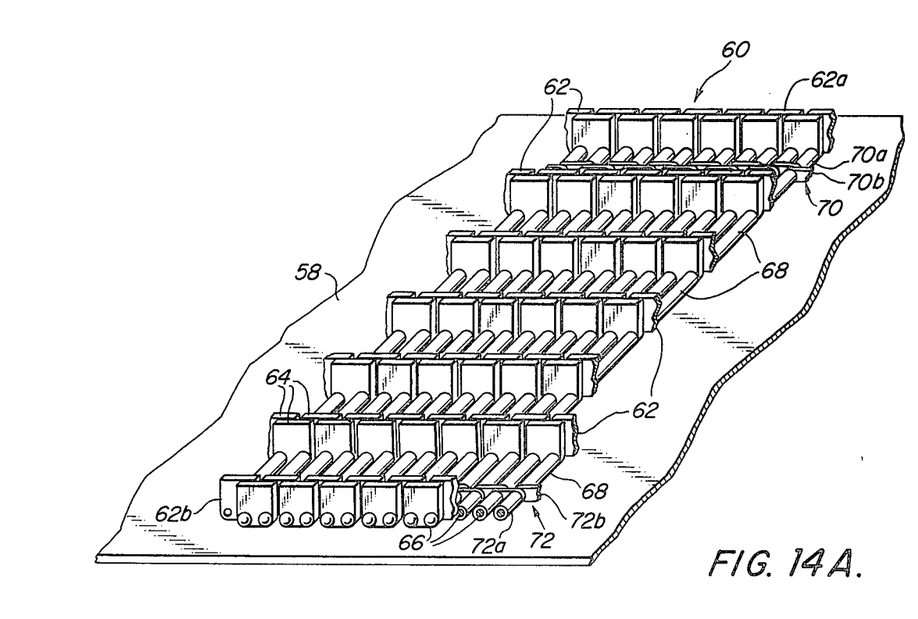
FIG. 14a is a partial axonometric view illustrating details of the diverting conveyor.

A mounting structure, gib 40, FIG. 11, and gib 42, FIG. 14, is used to slidingly support support frame 44. Mounting structure 40 includes two slide members 46, FIG. 14, and 48, FIG. 11. Slide member 46 is slidably supported in slides 50, 52 while slide member 48 is slidably supported in slides 54, 56, of gib 40. Plate 58 of support frame 44 carries dynamic roller conveyor or endless roller chain conveyor 60, which is shown in more detail in FIG. 14a. Roller conveyor 60 includes a plurality of raised flights 62, each set composed of a group of overlapping blades 64, which are mounted on shafts 66 and spaced by rollers 68. Just within the outermost sets of flights 62a and 62b, there are located chain sections 70, 72, each of which includes somewhat shorter rollers 70a and 72a and chain links 70b and 72b.

These chain sections are engaged by sprockets 80, 82, driven by shaft 84. Electric solenoid actuators 86 and 88 selectively raise and lower support frame 44 to control the diverting action. Slots 90 provided between members 18 permit each set 62 of raised flights to pass around the thin edges 92 of plate 58.

The main conveyance direction of conveyor unit 10, FIG. 11, is in the direction of arrow 94, either forward, 96, or reverse, 98. The transverse direction to this is designated the diverting direction 100 and is referred to merely as left 102 and right 104.

Figure 15:
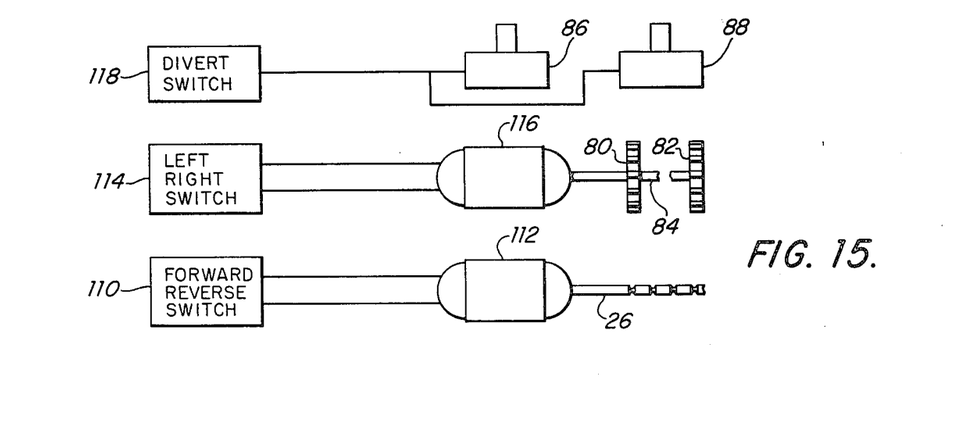
FIG. 15 is a schematic diagram of the controls for the conveyor system according to this invention.

In operation, a forward-reverse switch 110, FIG. 15, is actuated to drive motor 112 and shaft 26 in either the forward or reverse direction. In addition, left-right switch 114 is operated to cause motor 116 to drive shaft 84 and sprockets 80, 82, in either the left or the right direction. Motor 116 may be run at a much higher speed relative to motor 112, so that diverting to the left or right by dynamic conveyor 16 may be effected quickly without interfering with the oncoming goods traveling in the main direction 94. Periodically, regularly or randomly, when diverting is required, left-right switch 114 is actuated to designate the proper direction of diverting: motor 116 is generally kept running continuously to be constantly ready to immediately respond to a command. The divert switch 118 is then operated to actuate solenoids 86 and 88 to raise support frame 44 to place the tops of the sets of flights 62 sufficiently above rollers 16 to effect the diverting action.

Other embodiments will occur to those skilled in the art and are within the following claims:

What is claimed is:

1. A conveyor storage system comprising:
an elevator conveyor system including an elevator conveyor; first drive means for driving said elevator conveyor; and first control means for selectively energizing said drive means in the load and unload directions; said elevator conveyor having a plurality of carrier members fixed to and spaced longitudinally along it and extending outwardly therefrom; each of said carrier members including a plurality of elements extending outwardly from said conveyor and spaced from each other; and a transfer conveyor system including a delivery conveyor system having a plurality of individual modular conveyor units for engaging with said carrier members; said conveyor units being spaced apart to accommodate said carrier elements and extending into the spaces between said elements to load and unload said elevator conveyor system; second drive means for driving said conveyor units; and second control means for selectively energizing said second drive means in the load and unload directions for receiving and replacing product with its orientation unchanged; said transfer conveyor system further including a diverting conveyor system including: a support structure; a static conveyor including a plurality of spaced rollers mounted in said support structure; a drive apparatus for continuously driving said rollers; a main direction control device for operating said drive apparatus to drive said rollers to convey selectively in the forward and reverse direction; a support frame and a mounting structure carried on the support structure for slidably supporting said support frame; said mounting structure including spaced slides for slidably receiving a slide member carried by said support frame; an endless roller chain conveyor having parallel sets of raised laterally spaced flights and a drive chain section carried by said support frame; a drive system mounted on said support frame for continuously driving said roller conveyor; a transverse direction control device for operating said drive system to drive said roller conveyor to convey selectively in the left and right directions; and actuator means mounted on said support structure for moving said support frame selectively up to insert said flights interstitally of said rollers to divert conveyed goods from the main direction and down to withdraw said flights and allow goods to continue in the main direction.

2. A conveyor storage system comprising:

an elevator conveyor system including an elevator conveyor; first drive means for driving said elevator conveyor; and first control means for selectively energizing said drive means in the load and unload directions; said elevator conveyor having a plurality of carrier members fixed to and spaced longitudinally along it and extending outwardly therefrom; each of said carrier members including a plurality of elements extending outwardly from said conveyor and spaced from each other;

a transfer conveyor system including a delivery conveyor system having a plurality of individual modular conveyor units for engaging with said carrier members; said conveyor units being spaced apart to accommodate said carrier elements and extending into the spaces between said elements to load and unload said elevator conveyor system; second drive means for driving said conveyor units; and second control means for selectively energizing said second drive means in the load and unload directions for receiving and replacing product with its orientation unchanged; and a diverting conveyor system including:

a support structure;

a static conveyor including a plurality of spaced rollers mounted in said support structure;

a drive apparatus disposed within said support structure for continuously driving said rollers;

a main direction control device for operating said drive apparatus to drive said rollers to convey selectively in the forward and reverse direction;

a support frame and a mounting structure carried on the support structure for slidably supporting said support frame; said mounting structure including spaced slides for slidably receiving a slide member carried by said support frame;

an endless roller chain conveyor having parallel sets of raised laterally spaced flights and a drive chain section carried by said support frame;

a drive system mounted on said support frame for continuously driving said roller conveyor;

a transverse direction control device for operating said drive system to drive said roller conveyor to convey selectively in the left and right directions; and actuator means mounted on said support structure for moving said support frame selectively up to insert said flights interstitially of said rollers to divert conveyed goods from the main direction and down to withdraw said flights and allow goods to continue in the main direction.

* * * * *